April 5, 1966  D. H. FISHER  3,244,972
TEST-COIL POSITIONING MECHANISM
Filed March 25, 1964  4 Sheets-Sheet 1

INVENTOR
DELBERT H. FISHER
By Donald G. Dalton
Attorney

April 5, 1966 D. H. FISHER 3,244,972
TEST-COIL POSITIONING MECHANISM
Filed March 25, 1964 4 Sheets-Sheet 4

INVENTOR
DELBERT H. FISHER
By Donald G. Dalton
Attorney

United States Patent Office 3,244,972
Patented Apr. 5, 1966

3,244,972
TEST-COIL POSITIONING MECHANISM
Delbert H. Fisher, Columbus, Ohio, assignor, by mesne assignments, to United States Steel Corporation, a corporation of Delaware
Filed Mar. 25, 1964, Ser. No. 354,595
9 Claims. (Cl. 324—37)

This invention relates to flaw detection and particularly to apparatus for detecting flaws in large-diameter metal pipe.

A number of flaw-detection techniques utilizing magnetism have been applied to metal articles, depending on factors such as the type of flaw encountered and the sensitivity required. For example, in a fringe-flux technique for the detection of such defects in pipe seams or laps and tightly rolled-in defects, magnetic flux lines are induced to flow circumferentially in the wall of the pipe. The fringing of the flux caused by the presence of a defect is determined by a suitable pick-up coil system which actuates defect-indicating means. In the detection of such defects as pits and holes greater sensitivity is possible where a coil operating on an impedance or reluctance principle is actuated by a variable air gap between coil and pipe.

An object of the present invention is to provide a test-coil positioning mechanism for cooperation with metal pipe comprising means for supporting a pipe for rotation, in combination with a movable car and a reciprocable frame depending therefrom and supporting one or more test coils.

A more specific object is to provide pipe-testing apparatus including a car adapted to travel longitudinally over a length of pipe supported for rotation. A vertically-reciprocable frame depends from the car with means on the car for raising and lowering the frame. A pipe-magnetizing means is mounted adjacent the pipe and a bell crank pivoted on the frame has a magnetic-field exploring coil thereon. Means actuated by movement of the frame relative to the car turns a cam pivoted on the frame which tilts the bell crank and its magnetic-field exploring coil toward and away from an operative testing position relative to the pipe.

The foregoing and other features of my invention will be better understood from the following detailed description and drawings in which.

Figure 1:
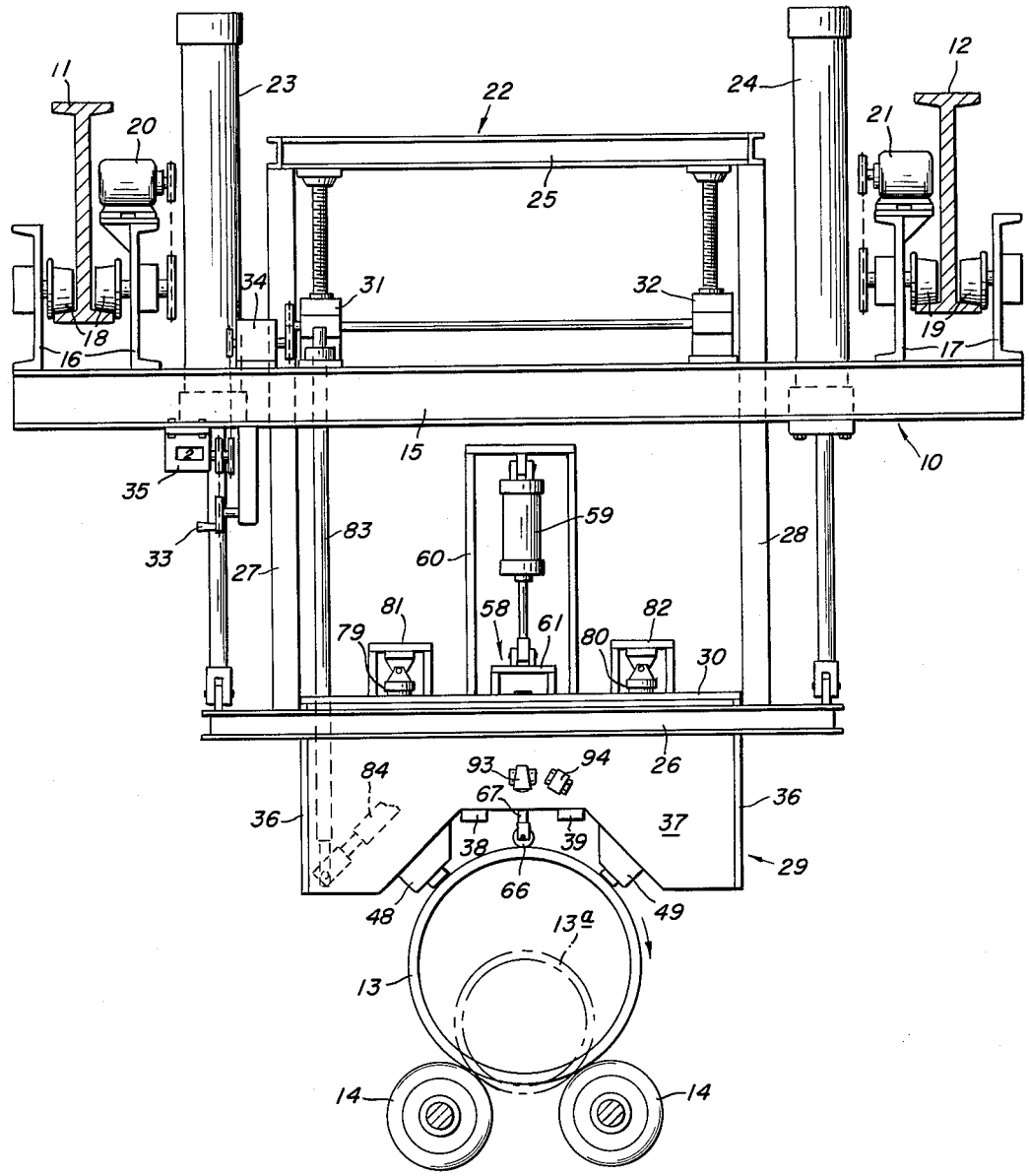
FIGURE 1 is a vertical section through the car and pipe-supporting means with the car and frame shown in elevation.

As shown in FIGURE 1, the pipe-testing apparatus includes a car 10 adapted to travel on laterally-spaced overhead longitudinal beams 11, 12, longitudinally of a pipe length which may vary in size from that shown at 13 to that shown at 13a. A pipe length in this size range is supported for rotation on longitudinally-spaced pairs of driven rolls 14. Car 10 comprises a pair of longitudinally-spaced transverse beams 15, mounted on laterally-spaced pairs of longitudinal channels 16, 17. The channels depend from beams 11, 12 on laterally-spaced pairs of trucks 18, 19, journaled in the respective channels. The trucks are powered for longitudinal reciprocation on beams 11, 12 by motors 20, 21.

Car 10 supports a rectangular frame 22 for vertical reciprocation by hydraulic motors 23, 24 which are mounted on beams 15. Frame 22 comprises spaced horizontal box members 25, 26 supported by spaced pairs of vertical members 27, 28. Box member 26, suspended from hydraulic motors 23, 24, supports a cover means 29, closed on top by a plate 30 and open at the bottom. For a purpose to be described later, jacks 31, 32, mounted on beams 15, limit downward movement of box member 25 and, hence, that of frame 22. A hand wheel 33 serves to reciprocate the jacks vertically by a chain and sprocket powered drive means 34, in accordance with a calibrated indicator 35 actuated by the chain drive.

Figure 2:
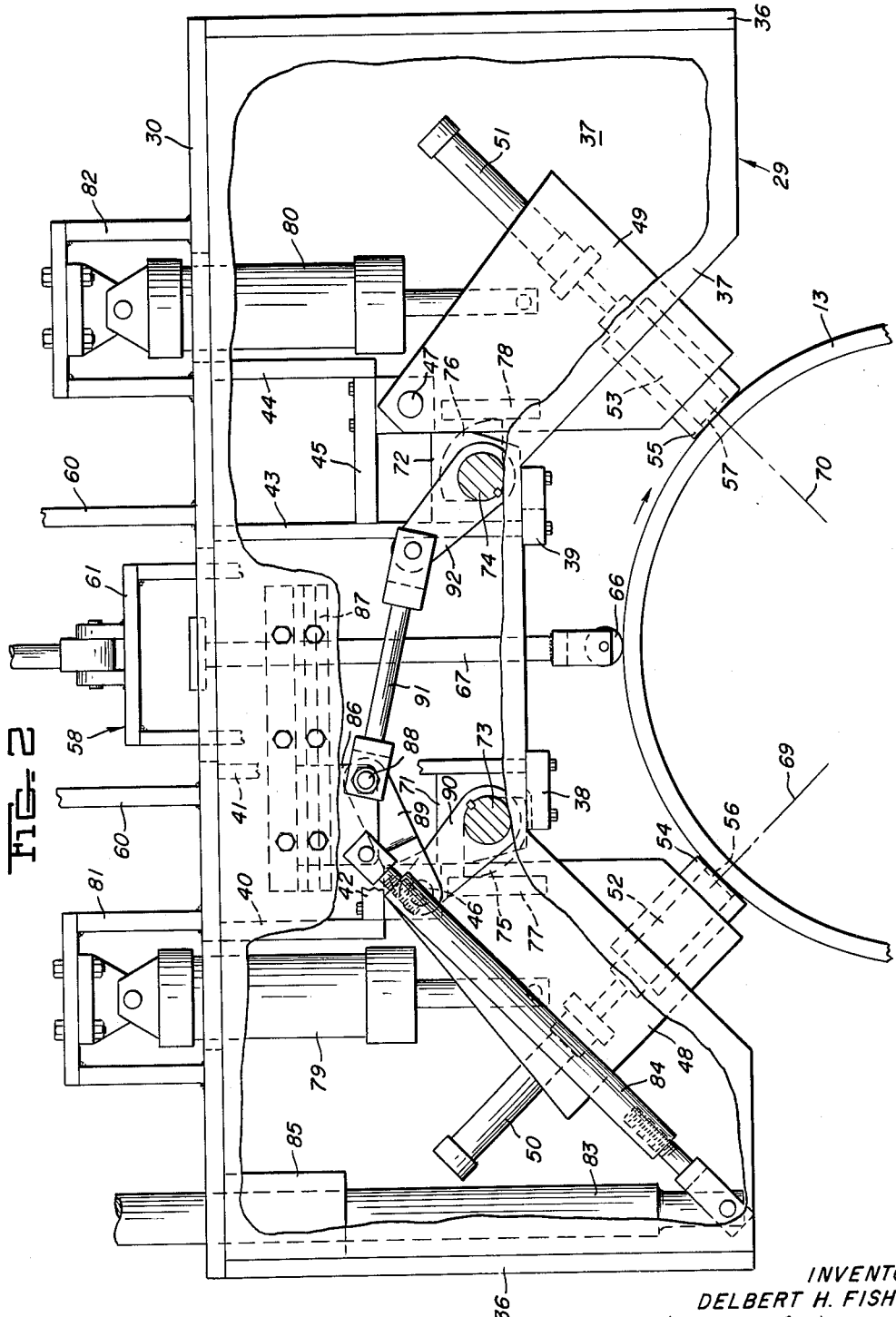
FIGURE 2 is an enlarged front-elevational view of the frame with the front cover broken away to show test coils and associated elements in their positions for the inspection of a pipe of maximum size.
Figure 3:
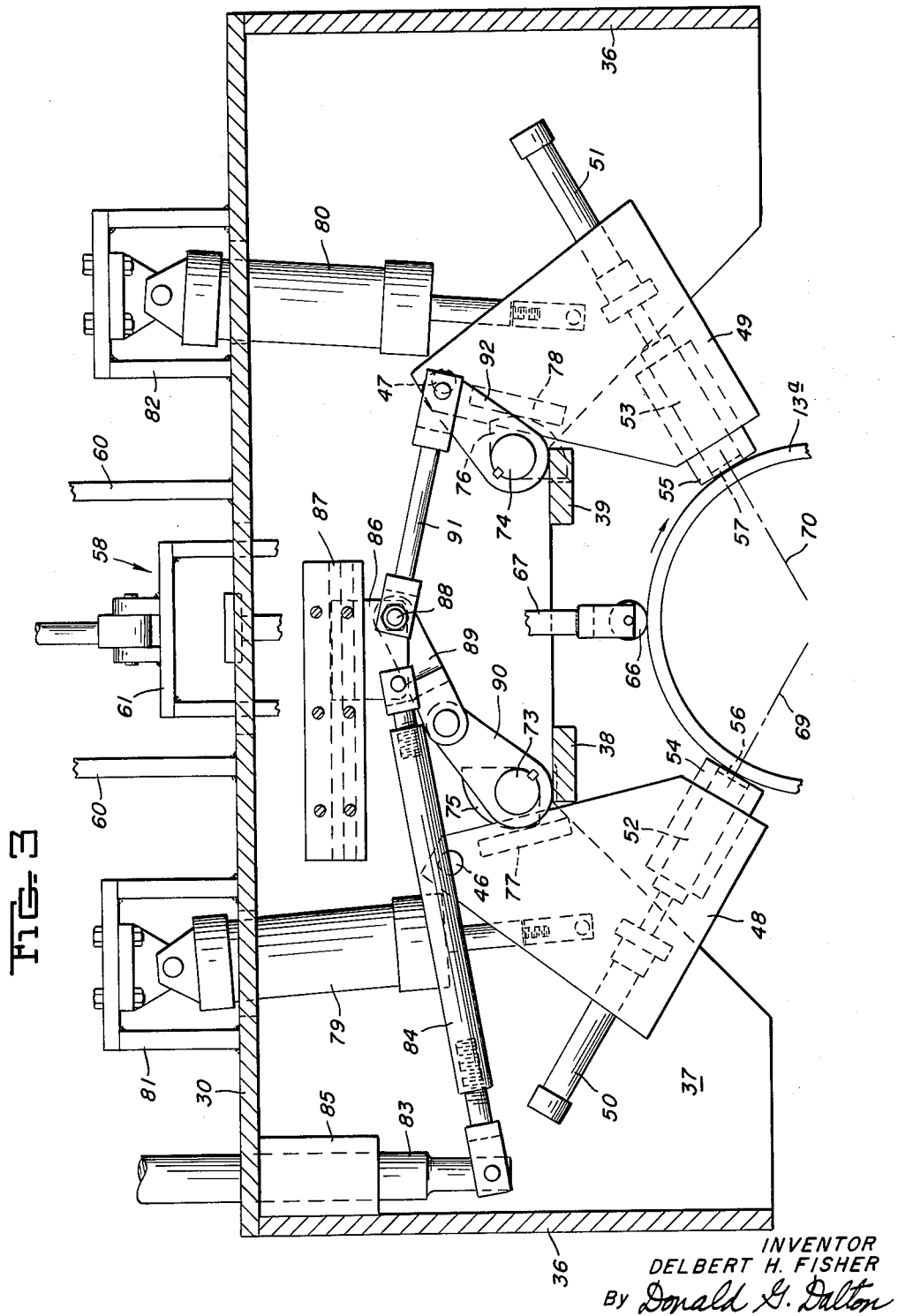
FIGURE 3 is a view similar to FIGURE 2 showing test coils and associated elements in their positions for the inspection of a pipe of minimum size.
Figure 4:
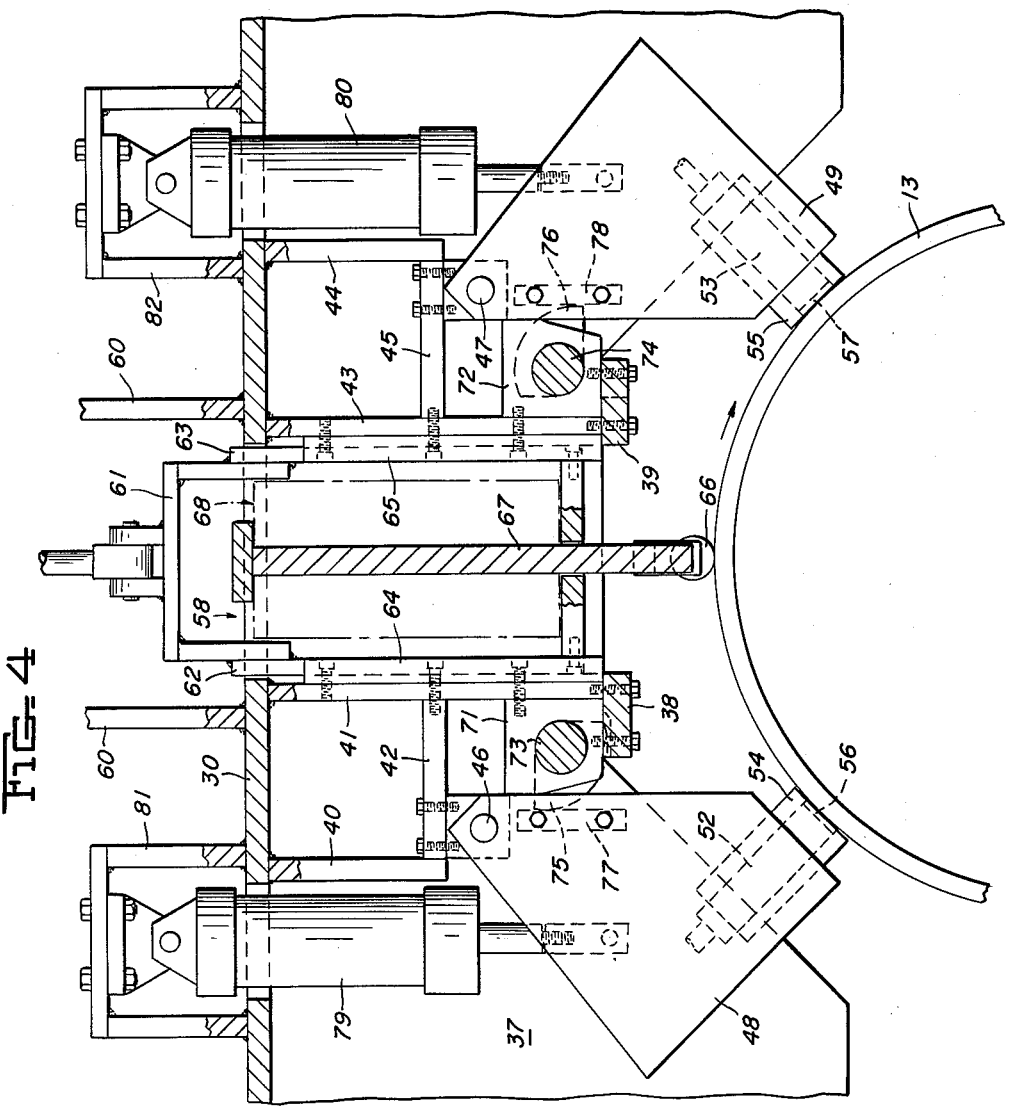
FIGURE 4 is a partial view similar to FIGURE 2 but with some parts removed to show other elements associated with the frame in greater detail.

As shown in FIGURES 2, 3 and 4, cover 29 comprises a top plate 30, vertical side plates 36 and vertical front and rear plates 37. Spaced longitudinal straps 38, 39 are bolted to front and rear plates 37. Mounted between plate 30 and straps 38, 39 is a supporting structure comprising spaced vertical members 40, 41 and a lateral connecting member 42. A substantially-similar supporting structure comprises vertical members 43, 44 and a lateral member 45.

Laterally-spaced pins 46, 47 depend from members 42, 45, respectively. Bell cranks 48, 49 are journaled on pins 46, 47, respectively, for angular movement in opposite directions toward and from the pipe. Hydraulic motors 50, 51, respectively, mounted on bell cranks 48, 49 support magnetic-field exploring coils 52, 53, respectively and serve to urge the coils toward the pipe when the coils are in operative testing positions relative thereto. The hydraulic motors permit the coils to slide in their respective bell cranks and thus compensate during pipe rotation for out-of-roundness and camber in the pipe. Wear-resistant shoes 54, 55 on the coils provide for direct contact with the pipe and define predetermined air gaps 56, 57 between pipe and coils.

As explained hereinabove, the usual defects found in large-diameter pipe can be explored with a magnetic-field exploring coil and, for maximum sensitivity, preferably with several coils. The coils may operate, for example, on the fringe-flux, impedance or reluctance principles. Magnetizing means mounted adjacent the pipe may be actuated by direct current, a permanent magnet or alternating current means associated with or separated from the coils. In the drawings, a direct current, magnetizing coil structure 58 is provided to induce a magnetic field in a pipe located on rolls 14. Coil structure 58 is pivoted to a hydraulic motor 59 suspended from a cover support 60.

As shown in FIGURE 4, hydraulic motor 59 serves to reciprocate coil box 61 vertically on its spaced ears 62, 63 slidable in ways 64, 65 which are bolted to vertical members 41, 43, respectively. A pair of spaced wheels 66 are clamped to the front and rear vertical edges of a core 67 reciprocable with its coil 68. The wheels serve to limit downward movement of the coil and determine its position relative to a pipe. In the illustrated arrangement, the magnetic flux induced by the coil when energized from a power source (not shown) would flow preferentially in the direction of the clockwise pipe rotation and circumferentially in the pipe wall to a point at some distance beyond coil 53. This coil operates, preferably on the fringe-flux principle, for the detection of such defects as seams and roll-ins. Coil 52 may operate on the impedance or reluctance principle from a permanent magnet or alternating current magnetizing means (not shown) associated with the coil.

As explained hereinafter, the structure described above is effective to test a range of pipe sizes and to assure positioning of test coils 52, 53 with their respective axes 69, 70 radially oriented or normal to tangents at circumferentially-spaced points on the pipe when the coils are in operative testing positions. FIGURES 2 and 3, respectively, show the relationship of the elements when testing relatively larger and smaller pipes in a size range, for example, between 26" and 14" outside diameter.

Laterally-spaced bushings 71, 72, respectively, are mounted on members 38, 41 and 39, 43. Cams 75, 76 are mounted on pins 73, 74 journaled in these bushings. Straps 38, 39 are recessed to allow free rotation of the cams. The cams normally bear against bell crank ears 77, 78 and are shaped to tilt the bell cranks 48, 49 to effect radial orientation of axes 69, 70 for any pipe size in a range, when coils 52, 53 are in operative testing positions. Hydraulic motors 79, 80 pivoted to cover supports 81, 82 and to bell cranks 48, 49 urge the bell cranks against cams 75, 76. During movement, bell cranks 48, 49 pivot in opposite directions, whereas cams 75, 76 rotate in the same direction. Hence, to actuate the bell cranks, the cams are rotated 180° with respect to each other.

Three linkages are provided to rotate the cams in accordance with the vertical reciprocation of frame 22. In the first linkage comprising arms 83, 84, fixed vertical arm 83 depends from beam 15, passes through plate 30 and is journaled in a bushing 85, mounted on plate 30. Arm 84 is pivoted to arm 83 and to a slide 86 laterally reciprocable in ways 87 mounted on vertical front plate 37. Vertical reciprocable movement of frame 22 produces corresponding relative lateral movement of slide 86. A pin 88 is journaled in slide 86. An arm 89 is pivoted on pin 88 and to a crank 90 which is keyed to pivot 73. This linkage rotates cam 75 according to the vertical reciprocation of frame 22. Rotation of cam 76 is provided by a linkage comprising an arm 91 pivoted to pin 88 and to a crank 92 which is keyed to pin 74.

As shown in FIGURE 1 and as described hereinabove, an indicator 35 is calibrated to indicate each size of pipe to be tested in a particular range of pipe sizes. Rotating handwheel 33 to a number corresponding to a particular pipe size adjusts jacks 31, 32 to limit downward movement of frame 22 by hydraulic motors 23, 24. This limited movement of frame 22 moves the described linkages to turn cams 75, 76 and thereby to tilt coils 52, 53 to their proper radial orientation and to position the coils in operative testing positions with respect to the pipe. Hydraulic motors 50, 51 urge the coils into cooperative relation with the rotating pipe.

When testing a length of pipe, the coils are positioned as described and operated in accordance with their respective principles to detect flaws. Associated mechanisms such as paint sprays may be controlled by the test-coil circuits to indicate the position of defects for later examination. The complete periphery of a length of pipe is tested by rotating the pipe at the preferred rotational speed and operating motors 20, 21 to move car 10 at the preferred longitudinal speed.

Motors 20, 21 move car 10 over away from the pipe. The tested pipe is kicked out by any suitable means (not shown) and a new length of pipe inserted in its proper position on rolls 14 by known means (not shown). If it is of the same diameter as the previously-tested pipe, adjustments in the height of jacks 31, 32 need not be made. Motors 20, 21 may be reversed and the new length tested for defects in the manner described. When the next length of pipe is of a different diameter, adjustments may be made, as previously described, to adjust the coils 52, 53 to their operative testing positions.

To avoid damaging the test coils, indicating means are provided to indicate when the frame 22 is over and away from the pipe. One such means is illustrated in FIGURE 1 as mounted on the front vertical plate 37. It comprises beam-emitting means 93 and photo-cell means 94 for sensing the light reflected from the pipe when frame 22 is over a length of pipe. Similar indicating means may be mounted on rear plate 37. By an electrical circuit or circuits (not shown) one or the other of means 93, 94 may be actuated and in turn actuate hydraulic motors 50, 51, 59, 79 and 80 to urge their associated elements toward and away from the pipe to be tested. For example, when a trailing vertical plate 37 moves away from an end of the pipe and the light beam is no longer reflected, the enumerated hydraulic motors are actuated to move their associated elements a preferred distance away from their operative testing positions. Conversely, when a leading vertical plate 37 moves toward an end of a succeeding length of pipe to be tested and the light beam is again reflected, the hydraulic motors are actuated to move their associated elements toward the pipe and into their operative testing positions with respect to the pipe.

From the foregoing description, it will be apparent that the present invention provides an apparatus of simple, compact construction, whereby pipe lengths may be rapidly and thoroughly tested for defects. Adjustments in jacks 31, 32 for different pipe sizes over a considerable range are effected very simply by adjusting hand wheel 33. It is obvious that the complete operation may be controlled by an operator or made automatic.

Although I have disclosed herein the preferred embodiment of my invention, I intend to cover as well any change or modification therein which may be made without departing from the spirit and scope of the invention.

I claim:

1. Pipe-testing apparatus comprising a car adapted to travel longitudinally of a length of pipe supported for rotation, a vertically-reciprocable frame depending from said car, means on the car for raising and lowering said frame, a bell crank pivoted on said frame having a magnetic-field exploring coil thereon, a cam pivoted on said frame adapted to tilt said crank toward and away from an operative testing position relative to said pipe, a pipe-magnetizing means mounted adjacent said pipe and means actuated by movement of said frame relative to said car, effective to turn said cam.

2. Apparatus as defined in claim 1 characterized by actuating means pivoted to said frame and to said bell crank for urging said bell crank against said cam.

3. Apparatus as defined in claim 1 characterized by slide means mounted for reciprocation on said frame, a linkage depending from said car pivoted to said slide means, a second linkage connecting said slide means and said cam, effective on movement of said frame relative to said car to turn said cam.

4. Apparatus as defined in claim 1 characterized by means on said car limiting downward movement of said frame at a preselected position, and effective for tilting said bell crank to an operative testing position relative to said pipe.

5. Apparatus as defined in claim 1 characterized by actuating means on said bell crank, effective to urge said magnetic-field exploring coil toward said pipe when said coil is in an operative testing position relative to said pipe, said coil being mounted on said actuating means.

6. Apparatus as defined in claim 1 characterized by actuating means pivoted to said frame and to said bell crank for urging said bell crank toward and away from said cam, indicating means on said frame for indicating when said frame is positioned over and away from said pipe, means operated by said indicating means for operating said actuating means, effective to urge said bell crank toward and away from said cam when said frame is positioned over and away from said pipe respectively.

7. Apparatus as defined in claim 1 characterized by a pipe-magnetizing coil, actuating means pivoted to said frame and to said coil, adapted to move said coil toward and away from an operative position relative to said pipe, indicating means on said frame for indicating when said frame is positioned over and away from said pipe, means operated by said indicating means for operating said actuating means, effective to move said coil toward and away from said operative testing position when said frame is positioned over and away from said pipe respectively.

8. Apparatus as defined in claim 7 characterized by means depending from said coil, effective to limit downward movement of said coil at a preselected position relative to said pipe.

9. Apparatus as defined in claim 1 characterized by actuating means on said bell crank, effective to urge said magnetic-field exploring coil toward and away from said pipe, said coil being mounted on said actuating means, indicating means on said frame for indicating when said frame is positioned over and away from said pipe, means operated by said indicating means for operating said actuating means, effective to move said coil toward and away from said operative testing position when said frame is positioned over and away from said pipe respectively.

No references cited.

RICHARD B. WILKINSON, *Primary Examiner.*